United States Patent
Kubota et al.

[11] Patent Number: 5,852,508
[45] Date of Patent: Dec. 22, 1998

[54] LENS DEVICE, ULTRAVIOLET-RAY EMITTING DEVICE, AND OPTICAL DISC RECORDING DEVICE

[75] Inventors: Shigeo Kubota, Kanagawa; Naoya Eguchi, Tokyo, both of Japan

[73] Assignee: Sony Corporation, Japan

[21] Appl. No.: 649,759

[22] Filed: May 15, 1996

[30] Foreign Application Priority Data

May 18, 1995 [JP] Japan .................................. 7-119946

[51] Int. Cl.⁶ .............................. G02B 13/14; G02B 3/02; G02B 13/18; G02B 9/04
[52] U.S. Cl. ......................... 359/355; 359/350; 359/708; 359/793; 359/719
[58] Field of Search ..................................... 359/355, 708, 359/719, 15, 19, 570, 350, 793; 372/32

[56] References Cited

U.S. PATENT DOCUMENTS

| | | | |
|---|---|---|---|
| 4,668,056 | 5/1987 | Braat et al. .............................. | 359/719 |
| 4,891,663 | 1/1990 | Hirose ..................................... | 359/355 |
| 4,986,641 | 1/1991 | Braat ........................................ | 359/15 |
| 5,419,968 | 5/1995 | Okada et al. ........................... | 428/421 |
| 5,615,199 | 3/1997 | Tatsuno et al. ......................... | 372/32 |
| 5,631,779 | 5/1997 | Kashima ................................. | 359/570 |
| 5,657,168 | 8/1997 | Maruyama et al. .................... | 359/719 |

*Primary Examiner*—Jon Henry
*Assistant Examiner*—Audrey Chang
*Attorney, Agent, or Firm*—Ronald P. Kananen

[57] ABSTRACT

A lens device for focusing a beam of an ultraviolet-ray region, provided with at least one aspherical lens made of synthetic quartz in which an aspherical portion is formed by a coating a fluororesin on a spherical portion of a side polished to a spherical surface; an ultraviolet-ray emitting device provided with a laser beam source emitting a beam in the ultraviolet-ray region and an object lens which has at least one of the above aspherical lenses; and an optical disc recording device provided with a laser beam source emitting a beam in the ultraviolet-ray region, a light intensity modulating means for modulating the intensity of the laser beam emitted from the laser beam source in accordance with a data signal; and the above object lens.

8 Claims, 8 Drawing Sheets

LENS DEVICE, ULTRAVIOLET-RAY EMITTING DEVICE, AND OPTICAL DISC RECORDING DEVICE

BACKGROUND OF THE INVENTION

1. Field of the Invention

The present invention relates to a lens device for focusing the light in an ultraviolet-ray region to the surface of a medium to be irradiated on and to an ultraviolet-ray emitting apparatus and optical disc recording device using this lens apparatus.

2. Description of the Prior Art

Progress has been made in increasing the density of optical discs serving as storage media for computers and package media for video information. The increase of density of optical discs comes in two forms: higher density recording and higher density reproduction. In both cases, it is effective to shorten the wavelength of the laser beam emitted from the light source to the optical disc.

For example, in the process for manufacturing an optical disc, by modulating the intensity of the shorter wavelength laser beam emitted from a short wavelength light source in accordance with the data signal and firing it on a photoresist on a master disc, it is possible to produce an optical disc with high density recording.

In an optical disc cutting system of the related art, the object lens device was constituted by a combination of a spherical lens made of synthetic quartz. It is relatively easy to make a surface of a synthetic quartz lens spherical, but it is difficult to make it aspherical. For this reason, the size of the conventional object lens device becomes large, i.e., has for example a diameter of 20 to 30 mm, a length of 50 mm, and a weight of 100 g. For this reason, the focus driving mechanism becomes large in size. When the object lens device and the focus driving mechanism become large, reduction of the size and reduction of the weight of the entire optical disc cutting device are prevented.

Also, the optical disc cutting device performs tracking control of the object lens device by moving an X-Y stage, so could not perform high speed beam scanning.

OBJECT AND SUMMARY OF THE INVENTION

The present invention was made in consideration with the above situation and has an object to provide a lens device which enables the focus driving mechanism to be made smaller and which enables a reduction of size and a reduction of weight of the device to which it is applied.

Another object of the present invention is to provide an ultraviolet-ray focusing device which can be reduced in size and reduced in weight due to the fact the focus driving mechanism can be made small.

A further object of the present invention is to provide an optical disc recording device which can be reduced in size and reduced in weight since the focus driving mechanism can be made small.

So as to achieve the above first object, according to a first aspect of the invention, there is provided a lens device for focusing a beam of an ultraviolet-ray region, provided with at least one aspherical lens made of synthetic quartz in which an aspherical portion is formed by a coating a fluororesin on a spherical portion of a side polished to a spherical surface.

So as to achieve the above second object, according to a second aspect of the invention, there is provided an ultraviolet-ray emitting apparatus provided with a laser beam source emitting a beam in the ultraviolet-ray region and an object lens which has at least one aspherical lens made of synthetic quartz in which an aspherical portion is formed by a coating a fluororesin on a spherical portion of a side polished to a spherical surface.

So as to achieve the above third object, according to a third aspect of the invention, there is provided an optical disc recording apparatus provided with a laser beam source emitting a beam in the ultraviolet-ray region; a light intensity modulating means for modulating the intensity of the laser beam emitted from the laser beam source in accordance with a data signal; and an object lens which has at least one aspherical lens for focusing the laser beam modulated by the light intensity modulating means on the surface of an optical disc, which aspherical lens is made of synthetic quartz in which an aspherical portion is formed by a coating a fluororesin on a spherical portion of a side polished to a spherical surface.

BRIEF DESCRIPTION OF THE DRAWINGS

These and other objects and features of the present invention will become clearer from the following description of the related art and preferred embodiments of the invention made with reference to the following drawings, in which.

DETAILED DESCRIPTION OF THE PREFERRED EMBODIMENTS

Figure 1:
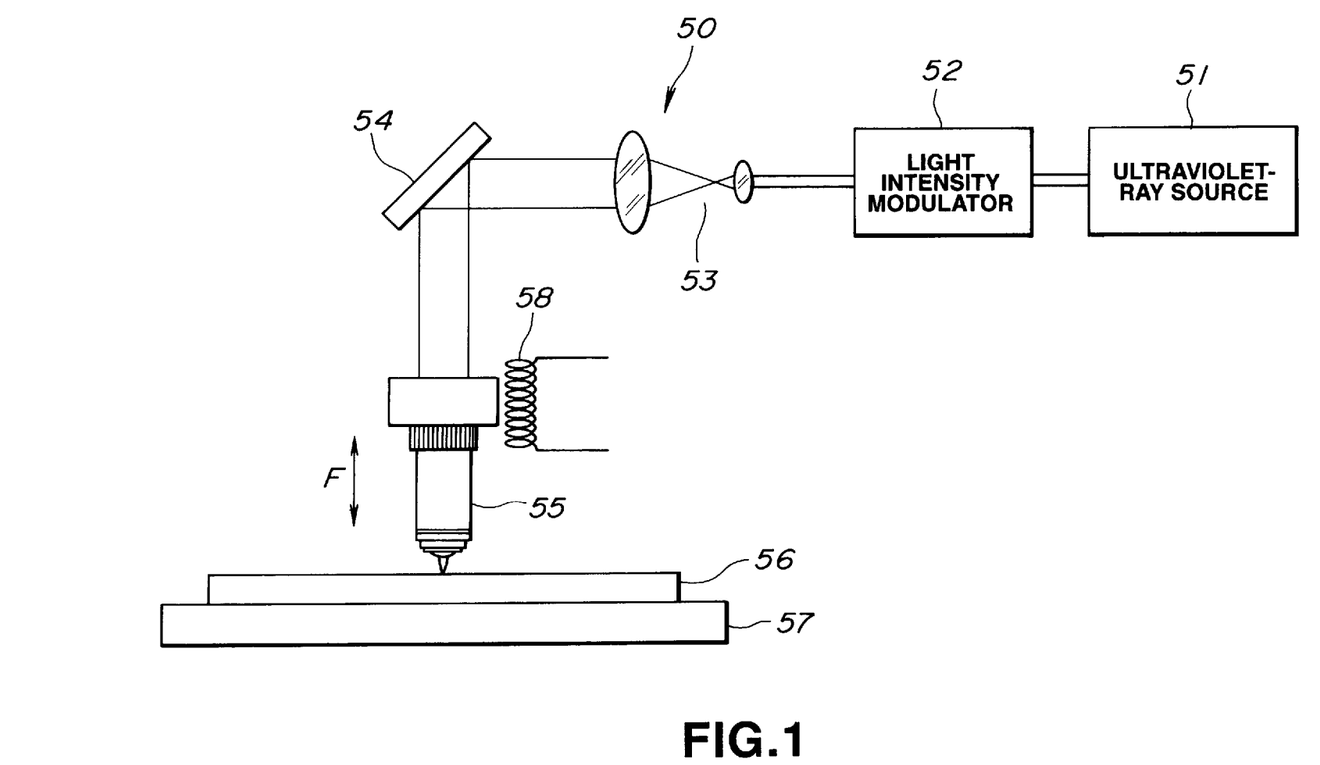
FIG. 1 is a schematic view of the configuration of an optical disc cutting apparatus incorporating an ultraviolet-ray emitting device of the related art.

Before describing the preferred embodiments, an explanation will be made, with reference to FIG. 1, of an optical disc cutting apparatus of the related art using for example an ultraviolet laser beam having a wavelength of 266 nm as the shortened wavelength laser beam. The ultraviolet laser beam emitted from the ultraviolet-ray source 51, which is the shortened wavelength light source of this optical disc cutting apparatus 50, is modulated in intensity in accordance with the data signal by a light intensity modulator 52. The luminous flux of the ultraviolet laser beam transmitted through the light intensity modulator 52 is transformed to a large luminous flux by a beam expander 53. The ultraviolet laser beam transformed to the large luminous flux by the beam expander 53 is reflected at a returning mirror 54 and guided to an object lens device 55. The object lens device 55 is constituted by a combination of spherical lenses and focuses the ultraviolet laser beam modulated in intensity in accordance with the data signal onto the master disc 56.

At this time, the master disc 56 is rotating on an X-Y stage 57. Also, the X-Y stage 57 performs tracking control by moving the master disc 56 in an X-Y direction. Further, the focus control is carried out by moving the object lens device 55 in a direction indicated by an arrow F in the figure by a drive coil 58.

The master disc 56 is formed by coating a photoresist on a glass disc having a thickness of for example 6 mm to a thickness of for example 0.1 $\mu$m. The ultraviolet laser beam is set in intensity by the light intensity modulator 52 and exposes the photoresist with an intensity in accordance with the data signal. Thereafter, when the master disc 56 is developed, the exposed portions of the photoresist are dissolved in a developing solution and a series of pits is formed. Metal is deposited in the series of pits formed in the master disc 56 by evaporation deposition, then the disc is played back to check the state of recording and for the existence of defects due to scratches etc. Thereafter, for example the disc is nickel plated to form a stamper. A large amount of replicas are formed using this stamper. The optical discs with the high density recording are formed from these replicas.

As mentioned briefly above, in the object lens device 55 used in the optical disc cutting device 50, the ultraviolet laser beam ends up absorbed into a glass lens, so the device was conventionally constituted by a combination of spherical lenses made of synthetic quartz. It is relatively easy to make a surface of a synthetic quartz lens spherical, but it is difficult to make the same aspherical. For this reason, the size of the conventional object lens device 55 became large, i.e., had for example a diameter of 20 to 30 mm, a length of 50 mm, and a weight of 100 g. For this reason, also the focus driving mechanism provided with the drive coil 58 driving the object lens device 55 became large in size. When the object lens device 55 and the focus driving mechanism become large, the reduction of size and reduction of weight of the entire optical disc cutting device are prevented.

Also, the optical disc cutting apparatus 50 performs the tracking control of the object lens device 55 by moving the X-Y stage 57, so could not perform high speed beam scanning.

An explanation will next be made of preferred embodiments of the lens device, ultraviolet-ray emitting device, and optical disc recording device according to the present invention as components of an optical disc cutting apparatus and with reference to an optical pick-up device.

Figure 2:
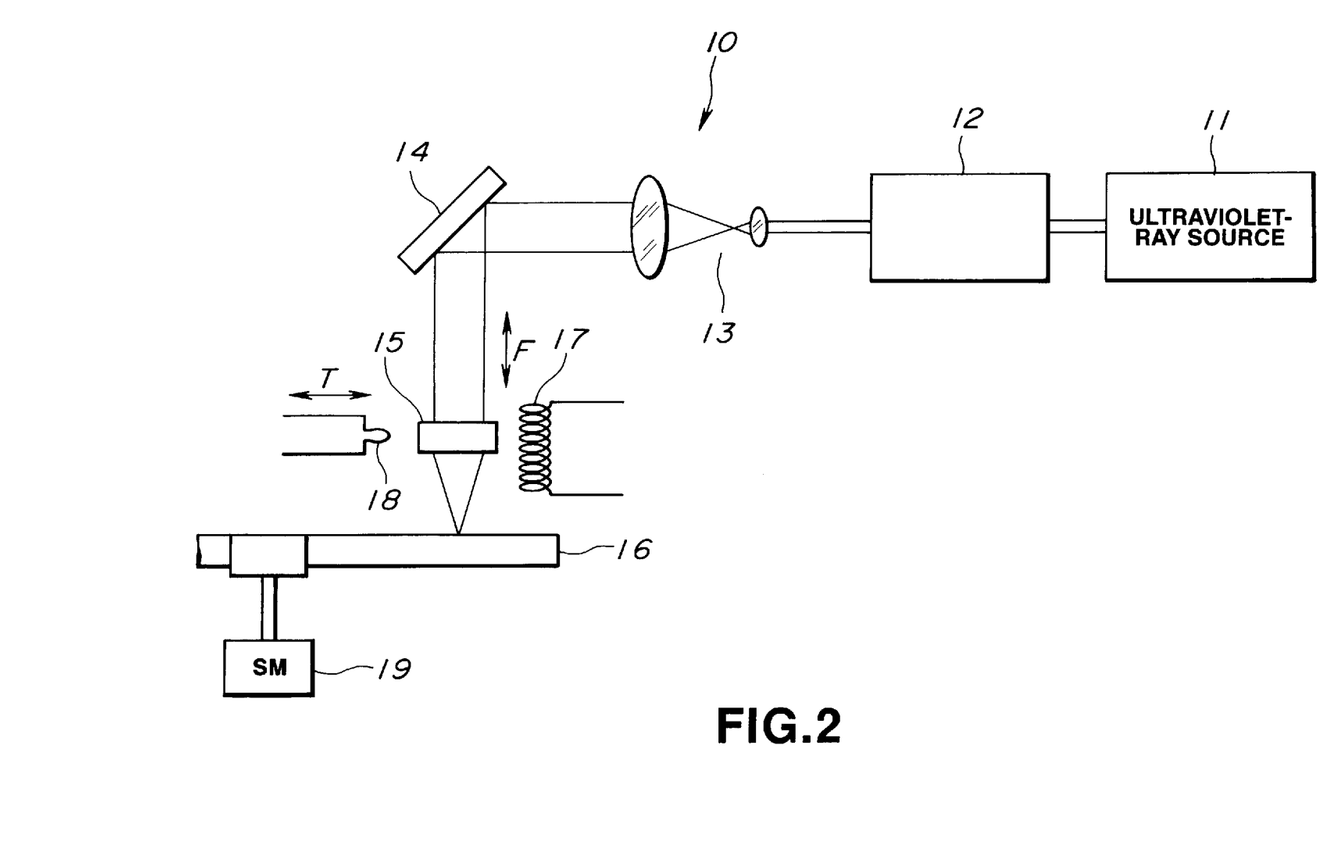
FIG. 2 is a schematic view of the configuration of an optical disc cutting apparatus incorporating a lens device and an ultraviolet-ray emitting device according to the present invention.

First, in the optical disc cutting apparatus 10 shown in FIG. 2, an ultraviolet laser beam, which is the light of the ultraviolet-ray region, is modulated in intensity in accordance with the data signal by the light intensity modulator 12, and then emitted to the photoresist on the master disc 16.

After this, when the master disc 16 is developed, the portions of the photoresist exposed to the ultraviolet laser beam are dissolved in the developing solution to form a series of pits. Metal is deposited on this by evaporation deposition, then the disc is played back to check the state of the recording, the state of defects due to scratches etc. Then, the disc is for example nickel plated to form a stamper. A large amount of replicas are formed by using this stamper. The optical discs with high density recording are formed from these replicas.

Here, the object lens device 15 is provided with at least one synthetic quartz lens formed with an aspherical surface by coating a fluororesin on a side polished to a spherical surface.

The optical disc cutting apparatus 10 is provided with this object lens device 15 and a drive coil 17 serving as the driving means for driving this object lens device 15 in at least the light axis direction.

Also, this optical disc cutting apparatus 10 is provided with an ultraviolet-ray source 11 such as an ultraviolet laser for emitting the laser beam of the ultraviolet-ray region having a wavelength of for example 266 nm as a short wavelength light source. The luminous flux of the ultraviolet laser beam emitted from the ultraviolet-ray source 11 and modulated in intensity by the light intensity modulator 12 is transformed to a large luminous flux by the beam expander 13. The ultraviolet laser beam transformed to the large luminous flux by the beam expander 13 is reflected at the returning mirror 14 and guided to the object lens device 15. The object lens device 15 emits the ultraviolet laser beam to the photoresist on the master disc 16. Note that, the master disc 16 is rotating by the rotational driving force generated by a spindle motor 19.

Here, the focus control is carried out by driving the object lens device 15 in the direction indicated by an arrow F in the figure by the focusing drive coil 17. Also, the tracking control is carried out by driving the object lens device 15 in the direction indicated by an arrow T in the figure by the tracking drive coil 18.

Figure 3:
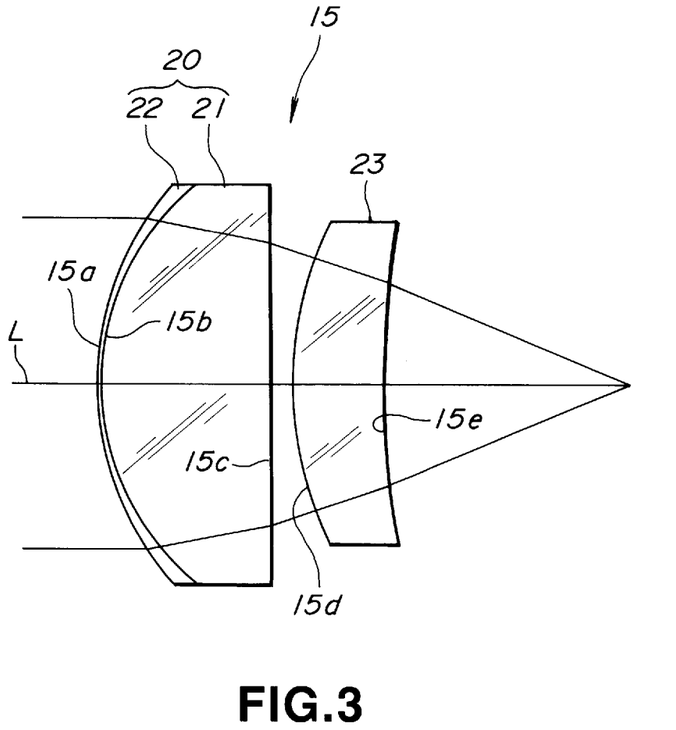
FIG. 3 is a diagrammatic view of an object lens device used in the optical disc cutting apparatus of FIG. 2.

The object lens device 15 comprises a first lens 20 made of synthetic quartz polished to a spherical surface on one side and formed with an aspherical portion 22 by coating a fluororesin on the surface of its spherical portion 21, and a second lens 23 made of synthetic quartz polished to a spherical surface on one side as shown in FIG. 3. In the first lens 20, the aspherical portion 22 formed by the coating of the fluororesin has a refractive index n of 1.41 to 1.43.

Also, this object lens device 15 is provided with a first surface 15a which is the front surface of the aspherical portion 22 of the first lens 20, a second surface 15b which is the front surface of the spherical portion 21, a third surface 15c which is the back surface of the spherical portion 21, a fourth surface 15d which is the front surface of the second lens 23, and a fifth surface 15e which is the back surface of the second lens 23.

Below, an explanation will be made of some embodiments of this object lens device 15.

The first embodiment is an object lens device which has a numerical aperture NA (=0.4) giving a focal distance of 4.674 mm and a back focus of 2.7 mm with respect to an ultraviolet laser beam having a wavelength of 266 nm, and has an exit pupil diameter of 4.1 mm. Further, the refractive index n of the aspherical portion 22 of the first embodiment is 1.41.

In this first embodiment, the aspherical shape Z can be expressed as:

$$Z = \frac{(CURV)h^2}{1 + \sqrt{1 - (1+k)(CURV)^2 h^2}} + Ah^4 + Bh^6 + Ch^8 + Dh^{10} \quad (1)$$

In this formula (1), CURV is the curvature of an inscribed spherical surface of the aspherical surface; k is a conical constant; h is an amount of displacement from the center axis; A is a fourth order aspherical coefficient; B is a sixth order aspherical coefficient; C is an eighth order aspherical coefficient; and D is a tenth order aspherical coefficient.

This first embodiment provides the following lens dimensions. Note that, here, the lens dimensions are shown in the order of the radius of curvature, surface separation, and refractive index for each of the first surface 15a, second surface 15b, third surface 15c, fourth surface 15d, and the fifth surface 15e. Also, both of the radius of curvature and the surface separation of the object surface are infinite ($\infty$).

The radius of curvature of the first surface 15a is 3.10000, the surface separation is 0.050000, and the refractive index is 1.410000. The surface separation referred to here is the interval between the first surface 15a and the second surface 15b on the light axis L. Also, the refractive index referred to here is the refractive index between the first surface 15a and the second surface 15b, that is, the aspherical portion 22. Further, the aspherical coefficients of this first surface 15a shown in the formula (1) are k=−1.770441 (rotation hyperboloids), A=0.40556E-02, B=−0.146668E-03, C=0.000000E+00, and D=0.000000E+00.

The radius of curvature of the second surface 15b is 3.000000, the surface separation is 1.90000000, and the refractive index is 1.4996790000. Here, similar to the description of the first surface 15a, the surface separation is the interval between the second surface 15b and the third surface 15c on the light axis L. Further, the refractive index is a refractive index between the second surface 15b and the third surface 15c, that is, the spherical portion 21.

The radius of curvature of the third surface is infinite ($\infty$), the surface separation is 0.30000000, and the refractive index is similar to that of the air. The surface separation referred to here is the interval between the third surface 15c and the fourth surface 15d on the light axis L. Further, the refractive index is the refractive index between the third surface 15c and the fourth surface 15d, that is, the air.

The radius of curvature of the fourth surface 15d is 4.919710, the surface separation is 1.00000000, and the refractive index is 1.4996790000. The surface separation referred to here is the interval between the fourth surface 15d and the fifth surface 15e on the light axis L. Further, the refractive index is the refractive index between the fourth surface 15d and the fifth surface 15e, that is, the second lens.

The radius of curvature of the fifth surface 15e is 11.49383, the surface separation is 2.75143000, and the refractive index is similar to that of the air. The surface separation referred to here is the interval between the fifth surface 15e and the object surface on the light axis L. Further, the refractive index is the refractive index between the fifth surface 15e and the object surface, that is, the air.

Then, as to the lens specifications, when the thickness of the base is 0 mm, the numerical aperture (NA) is 0.40000, and the wavelength is 266 nm, the image height is 0.05000.

Figure 4A:
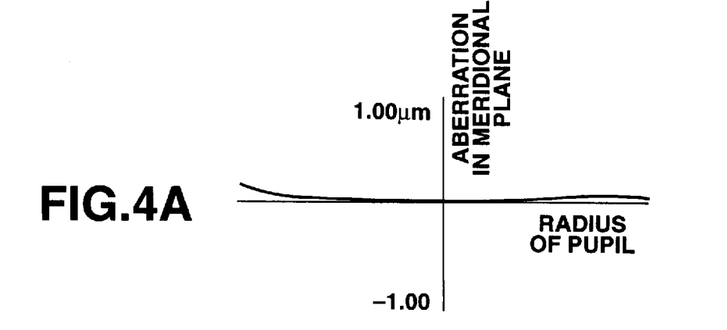
FIGS. 4A and 4B are graphs of the change of aberration in the meridional plane in a first embodiment of the object lens device.
Figure 4B:
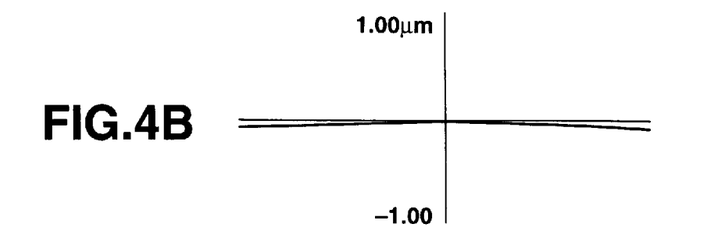
Figure 5A:
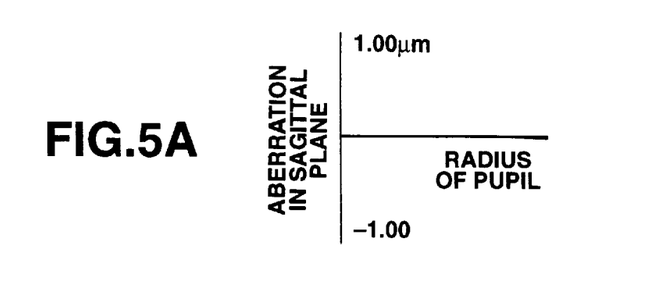
FIGS. 5A and 5B are graphs of the change of aberration in a sagittal plane in the first embodiment of the object lens device.
Figure 5B:
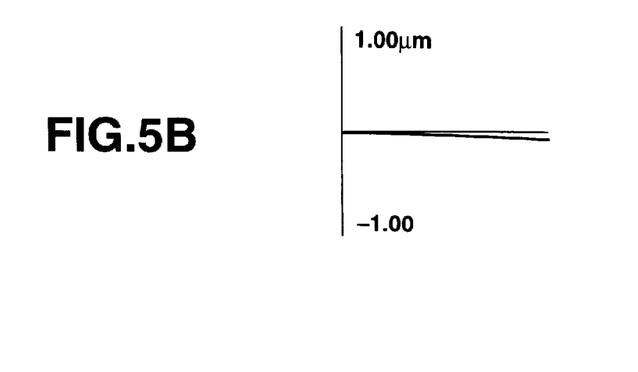

The change of the wavefront aberration of this first embodiment shown above with respect to the light axis is shown in FIGS. 4A and 4B and FIGS. 5A and 5B. FIG. 4A shows the change of aberration in the meridional plane when the inclination from the light axis is 0.5°, that is, at 0.5° outside of the axis; and FIG. 4B shows the aberration in the meridional plane on the axis. The aberration becomes 0.002 rms$\lambda$ on the axis, and 0.021 rms$\lambda$ at 0.5° outside of the axis. In both cases, it becomes sufficiently 0.07 rms$\lambda$ or less, which is Marechal's criterion. Note that, FIG. 5A shows the change of the aberration in the sagittal plane at 0.5° outside of the axis; and FIG. 5B shows the change of the aberration in the sagittal plane on the axis.

Accordingly, this first embodiment has a size smaller than that of the conventional device, but can suppress the wavefront aberration to Marechal's criterion or less even with respect to inclination of the light axis.

For this reason, the focus driving mechanism using the focusing drive coil 17 for driving the object lens device 15 to which the first embodiment is applied and performing the focus control can be reduced in size. Also, in the track driving mechanism using the tracking drive coil 18, the object lens device 15 to which the first embodiment is applied is driven for the track control, so also that track driving mechanism can be reduced in size.

Next, an explanation will be made of a second embodiment of the object lens device 15. This second embodiment is an object lens device which has a numerical aperture NA (=0.4) giving a focal distance of 4.674 mm and a back focus of 2.7 mm with respect to an ultraviolet laser beam having a wavelength of 266 nm and has an exit pupil diameter of 4.1 mm similar to the first embodiment. Also the aspherical shape Z of this second embodiment can be represented by the formula (1).

This second embodiment provides the following lens dimensions. Note that, here, the lens dimensions are indicated in the order of the radius of curvature, surface separation, and the refractive index for each of the type of the surfaces. Further, the surface separation and refractive index are defined the same as in the first embodiment. Further, the radius of curvature and surface separation of the object surface are both infinite ($\infty$).

The radius of curvature of the first surface 15a is 3.10000, the surface separation is 0.050000, and the refractive index is 1.420000. Further, the aspherical coefficients of this first surface 15a shown in the formula (1) are k=−1.746914 (rotation hyperboloids), A=0.404955E-02, B=−0.133193E-03, C=0.000000E+00, and D=0,000000E+00.

The radius of curvature of the second surface 15b is 3.000000, the surface separation is 1.90000000, and the refractive index is 1.4996790000. The radius of curvature of the third surface 15c is infinite ($\infty$), the surface separation is 0.30000000, and the refractive index is the same as that of the air. The radius of curvature of the fourth surface 15d is 4.87750, the surface separation is 1.00000000, and the refractive index is 1.4996790000. The radius of curvature of the fifth surface 15e is 11.21653, and the surface separation is 2.750606.

Then, as to the lens specifications, when the thickness of the base is 0 mm, the numerical aperture (NA) is 0.40000, and the wavelength is 266 nm, the image height is 0.05000 mm, the same as that of the first embodiment.

Figure 6A:
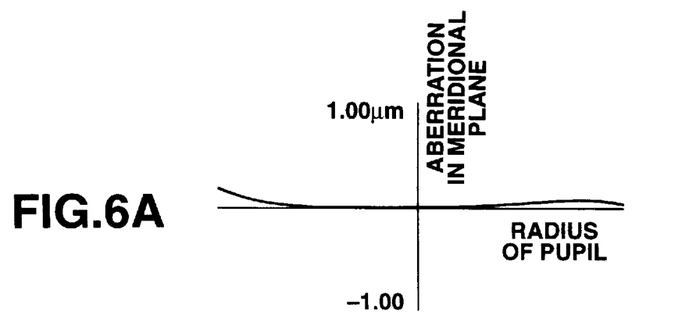
FIGS. 6A and 6B are graphs of the change of aberration in the meridional plane in a second embodiment of the object lens device.
Figure 6B:
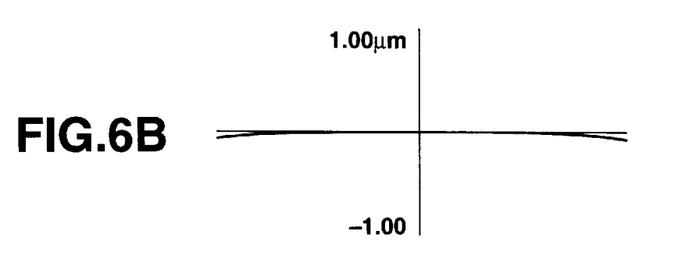
Figure 7A:
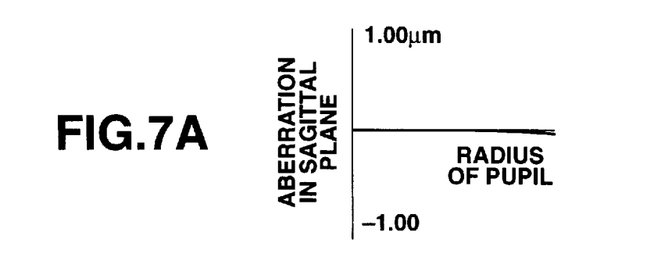
FIGS. 7A and 7B are graphs of the change of aberration in the sagittal plane in the second embodiment of the object lens device.
Figure 7B:
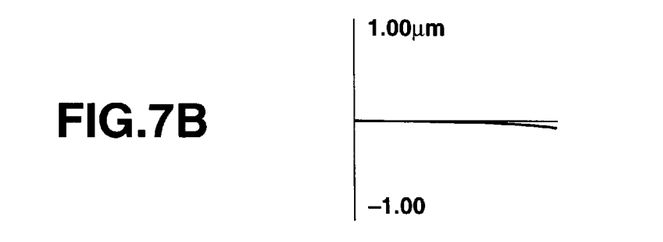

The change of the wavefront aberration of this second embodiment shown above with respect to the light axis is shown in FIGS. 6A and 6B and FIGS. 7A and 7B. FIG. 6A shows the change of aberration in the meridional plane at 0.5° outside of the axis; and FIG. 6B shows the aberration in the meridional plane on the axis. The aberration becomes 0.002 rms$\lambda$ on the axis, and 0.02 rms$\lambda$ at 0.5° outside of the axis. In both cases, it becomes sufficiently 0.07 rms$\lambda$ or less, which is Marechal's criterion. Note that, FIG. 7A shows the change of the aberration in the sagittal plane at 0.5° outside of the axis; and FIG. 7B shows the change of the aberration in the sagittal plane on the axis.

Accordingly, this second embodiment has a size smaller than that of the conventional object lens device similar to the first embodiment, but can suppress the wavefront aberration to Marechal's criterion or less even with respect to inclination of the light axis.

For this reason, the focus driving mechanism using the focusing drive coil 17 for driving the object lens device 15 to which the second embodiment is applied and performing the focus control can be reduced in size. Also, in the track driving mechanism using the tracking drive coil 18, the object lens device 15 to which the second embodiment is applied is driven for the track control, so also that track driving mechanism can be made small.

Next, an explanation will be made of a third embodiment of the object lens device 15. This third embodiment is also an object lens which has a numerical aperture NA (=0.4) giving a focal distance of 4.674 mm and a back focus of 2.7 mm with respect to an ultraviolet laser beam having a wavelength of 266 nm and has an exit pupil diameter of 4.1 mm similar to the first and second embodiments. Further, also the aspherical shape Z of this third embodiment can be represented as in the formula (1).

This third embodiment provides the following lens dimensions. Note that, here, the lens dimensions are indicated in the order of the radius of curvature, surface separation, and the refractive index for each of the types of the surfaces. Further, the surface separation and refractive index are defined as in the first embodiment. Further, the radius of curvature and surface separation of the object surface are both infinite (C).

The radius of curvature of the first surface 15a is 3.10000, the surface separation is 0.050000, and the refractive index is 1.430000. Further, the aspherical coefficients of this first surface 15a shown in the formula (1) are k=−1.740877 (rotation hyperboloids), A=0.398929E-02, B=−0.134266E-03, C=0.000000E+00, and D=0,000000E+00.

The radius of curvature of the second surface 15b is 3.000000, the surface separation is 1.90000000, and the refractive index is 1.4996790000. The radius of curvature of the third surface 15c is infinite (∞), the surface separation is 0.30000000, and the refractive index is the same as that of the air. The radius of curvature of the fourth surface 15d is 5.52523, the surface separation is 1.00000000, and the refractive index is 1.4996790000. The radius of curvature of the fifth surface 15e is 16.80428, and the surface separation is 2.786303.

Then, as to the lens specifications, when the thickness of the base is 0 mm, the numerical aperture (NA) is 0.40000, and the wavelength is 266 nm, the image height is 0.05000 mm, the same as that of the first and second embodiments.

Figure 8A:
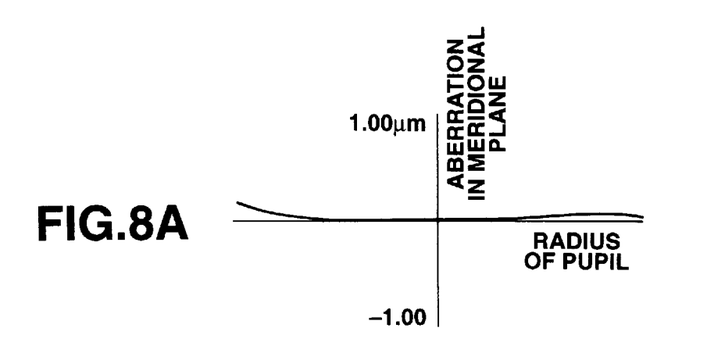
FIGS. 8A and 8B are graphs of the change of aberration in the meridional plane in a third embodiment of the object lens device.
Figure 8B:
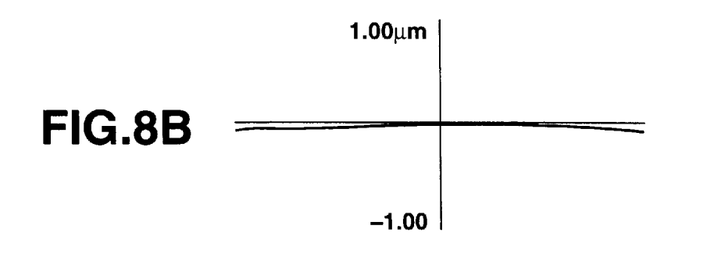
Figure 9A:
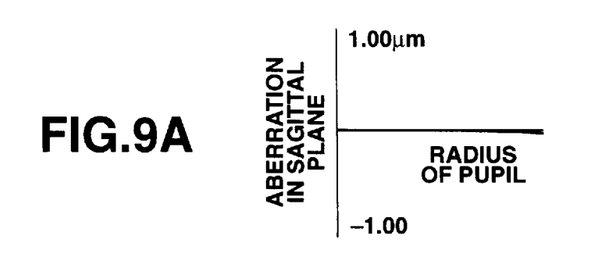
FIGS. 9A and 9B are graphs of the change of aberration in the sagittal plane in the third embodiment of the object lens device.
Figure 9B:
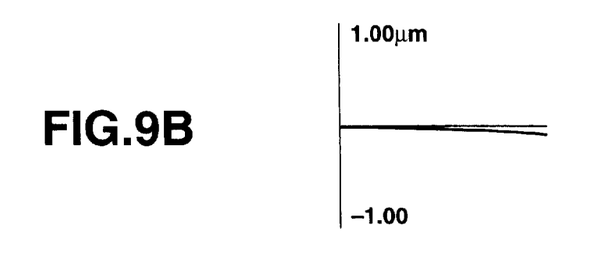

The change of the wavefront aberration of this third embodiment shown above with respect to the light axis is shown in FIGS. 8A and 8B and FIGS. 9A and 9B. FIG. 8A shows the change of aberration in the meridional plane at 0.5° outside of the axis; and FIG. 8B shows the aberration in the meridional plane on the axis. The aberration becomes 0.002 rmsλ on the axis, and 0.022 rmsλ at 0.5° outside of the axis. In both cases, it becomes sufficiently 0.07 rmsλ or less, which is Marechal's criterion. Note that, FIG. 9A shows the change of the aberration in the sagittal plane at 0.5° outside of the axis; and FIG. 9B shows the change of the aberration in the sagittal plane on the axis.

Accordingly, this third embodiment has a size smaller than that of the conventional object lens similar to the first and second embodiments, but can suppress the wavefront aberration to Marechal's criterion or less even with respect to inclination of the light axis.

For this reason, the focus driving mechanism using the focusing drive coil 17 for driving the object lens device 15 to which this third embodiment is applied and performing the focus control can be reduced in size. Also, in the track driving mechanism using the tracking drive coil 18, the object lens device 15 to which the third embodiment is applied is driven for the track control, so also that track driving mechanism can be reduced in size.

From the above, the optical disc cutting device 10 provided with the object lens device 15, focus driving mechanism, and the track driving mechanism as in these first, second, and third embodiments can realize a reduction of size and reduction of weight.

Figure 10:
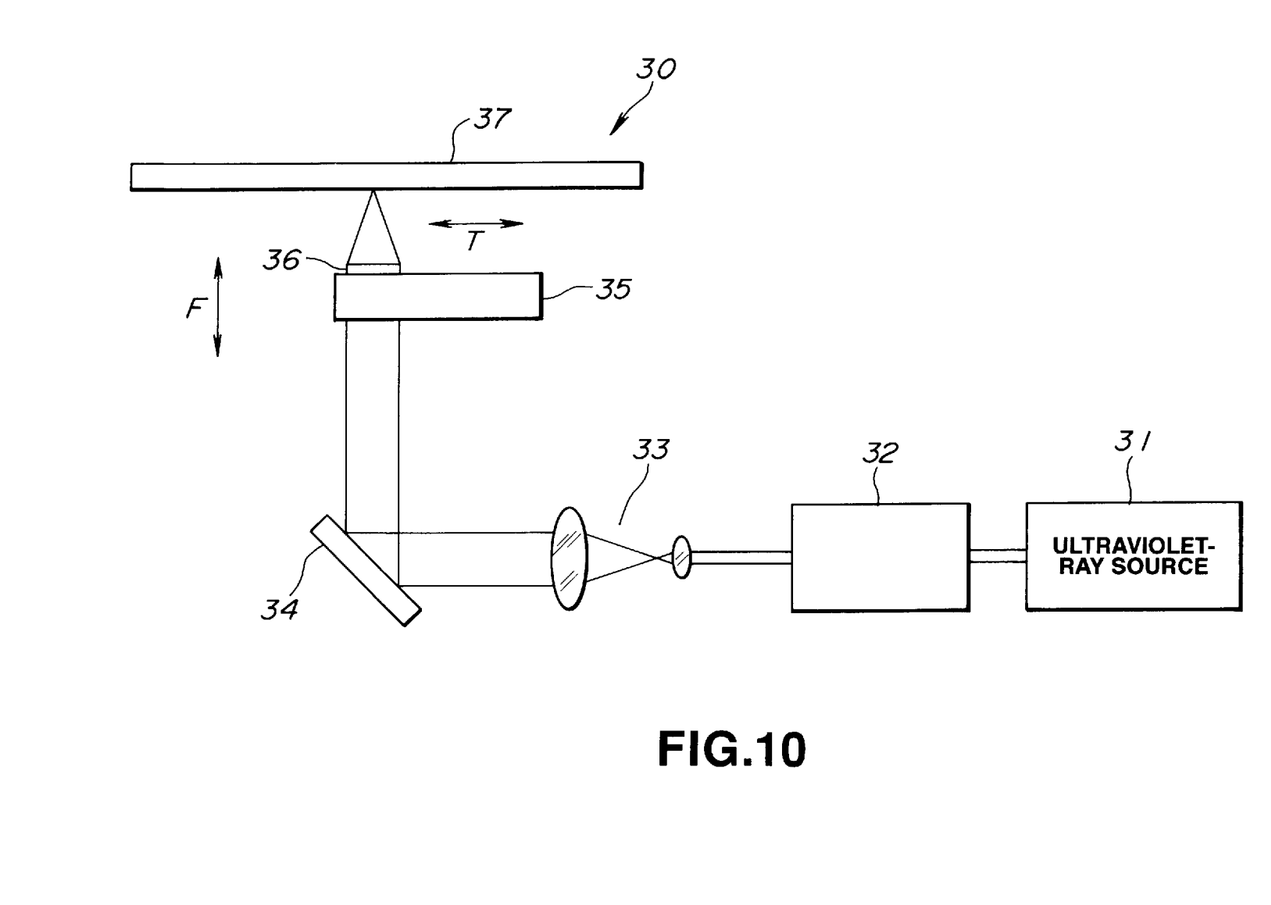
FIG. 10 is a schematic view of the configuration of an optical pick-up device incorporating an optical lens device and ultraviolet-ray emitting device according to the present invention.

Next, an explanation will be made of an optical pick-up device 30 referring to FIG. 10 as an example of an optical disc recording apparatus according to the invention.

This optical pick-up device 30 records a data signal on the signal recording surface of an optical disc 37 by using an ultraviolet laser beam, which is the light in the ultraviolet-ray region, emitted by the ultraviolet-ray source 31. This optical pick-up device 30 focuses the ultraviolet laser beam on the signal recording surface of the optical disc 37 by using the object lens device 36. Then,. this optical pick-up device 30 drives the object lens device 36 in the focus direction F which is the light axis direction and, at the same time, drives the same also in the tracking direction T which becomes the orthogonal direction with respect to the light axis direction.

In the optical pick-up device 30, the ultraviolet laser beam emitted from the ultraviolet-ray source 31 is modulated in intensity in accordance with the data signal by the light intensity modulator 32. The luminous flux of the ultraviolet laser beam transmitted through the light intensity modulator 32 is transformed to the large luminous flux by the beam expander 33. The ultraviolet laser beam with the luminous flux transformed by the beam expander 33 is reflected at the returning mirror 34 and then guided to the object lens device 36 in which the focus and tracking are controlled by a biaxial actuator 35. The object lens device 36 focuses the ultraviolet laser beam on the signal recording surface on the optical disc 37. Then, in this optical pick-up device 30, a recording mark in accordance with the data signal is formed on the signal recording surface on the optical disc 37 as mentioned above.

The object lens device 36 is formed by a combination of a synthetic quartz lens with an aspherical surface formed by coating a fluororesin on a surface polished to a spherical surface similar to the object lens device 15 and a spherical lens and has a structure as shown in FIG. 3. For this object lens device 36, the first to third embodiments can be applied.

Accordingly, also this object lens device 36 has a size smaller than the conventional device, but can suppress the wavefront aberration to Marechal's criterion or less even with respect to inclination of the light axis.

Figure 11:
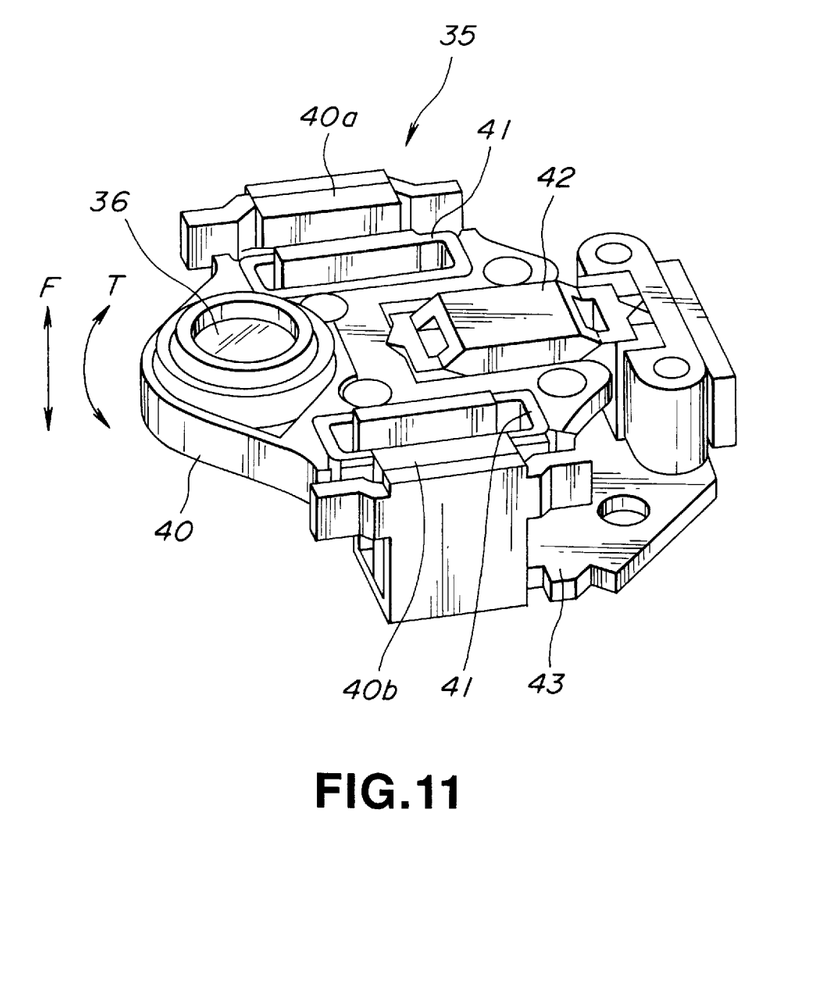
FIG. 11 is a perspective view of an outer appearance of a biaxial actuator used in the optical pick-up device of FIG. 10.

Note that, a schematic view of the biaxial actuator 35 controlling the focusing and tracking of this object lens device 36 is shown in FIG. 11. This biaxial actuator 35 comprises a lens holder 40 holding the object lens device 36, a coil 41 for the focusing drive and tracking drive, a pair of magnets 40a and 40b arranged so as to sandwich the coil 41 therebetween, a base 43, and an arm 42 having a hinge structure. The tracking control in this biaxial actuator 35 is carried out by pivoting the object lens device 36 in the direction indicated by the arrow T in the figure by the arm 42 having the hinge structure. Further, the focus control is carried out by vertically moving the object lens 36 in the direction indicated by the arrow F in the figure by these ring mechanisms.

The object lens device 36 has a small size and light weight as mentioned above, and accordingly also the biaxial actuator 35 controlling the focusing and tracking by driving this object lens device 36 can be reduced in size and weight.

From the above, also the optical pick-up device 30 provided with the object lens device 36 and the biaxial actuator 35 can realize a reduction of size and reduction of weight.

Note that, the lens device, the ultraviolet-ray emitting device, and the optical disc recording device according to the present invention are not limited to embodiments explained above. The former two, for example, may be incorporated into a laser drawing device or laser machining device provided with a laser device that focuses a laser beam of the ultraviolet-ray region by using an ultraviolet-ray aspherical lens.

What is claimed is:

1. A lens device for focusing a beam of an ultraviolet-ray region, provided with at least one aspherical lens made of synthetic quartz in which an aspherical portion is formed by coating a fluororesin on a spherical portion of a side polished to a spherical surface, wherein provision is further made of a spherical lens made of synthetic quartz with one side polished to a spherical surface, located at an image side of said aspherical lens.

2. A lens device for focusing a beam of an ultraviolet-ray region as set forth in claim 1, further comprising:

an ultraviolet-ray emitting apparatus provided with a laser beam source emitting said beam in the ultraviolet-ray region.

3. An ultraviolet-ray emitting apparatus as set forth in claim 2, wherein provision is further made of a driving means for driving said object lens in at least a light axis direction.

4. An ultraviolet-ray emitting apparatus as set forth in claim 3, wherein provision is further made of a driving means for driving said object lens in a direction orthogonal to the light axis direction.

5. A lens device for focusing a beam of an ultraviolet-ray region as set forth in claim 1, further comprising:

an optical disc recording apparatus provided with a laser beam source emitting a beam in the ultraviolet-ray region; and a light intensity modulating means for modulating the intensity of the laser beam emitted from said laser beam source in accordance with a data signal.

6. An optical disc recording apparatus as set forth in claim 5, wherein provision is further made of a driving means for driving said object lens in the light axis direction and in a direction orthogonal to the light axis direction.

7. A lens device for focusing a beam of an ultraviolet ray region as set forth in claim 1, wherein said beam passes through, in order:

a fifth surface, which is a nearly flat rear surface of said spherical lens;

a fourth surface, which is said spherical surface of said spherical lens;

a third surface, which is a flat rear surface of said aspherical lens;

a second surface, which is said spherical portion of said aspherical lens; and a first surface, which is said aspherical portion of said aspherical lens.

8. A lens device for focusing a beam of an ultraviolet ray region as set forth in claim 7, wherein said first surface and said second surface have radii of curvature at a ratio of 3.10000:3.00000.

* * * * *